No. 612,866. Patented Oct. 25, 1898.
C. F. NELSON.
ANIMAL TRAP.
(Application filed Oct. 25, 1897.)
(No Model.) 2 Sheets—Sheet 2.
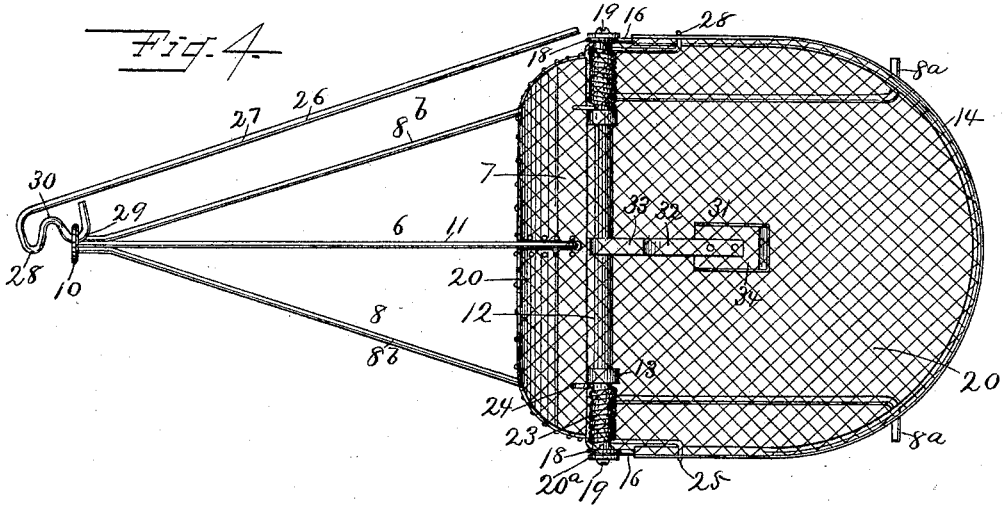
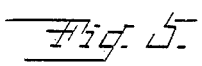
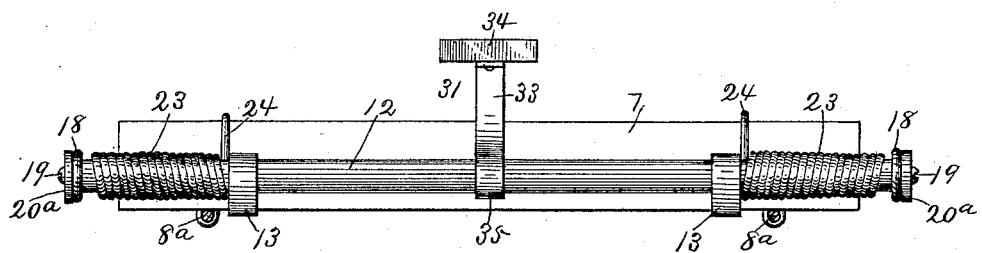
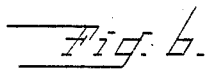
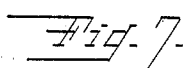
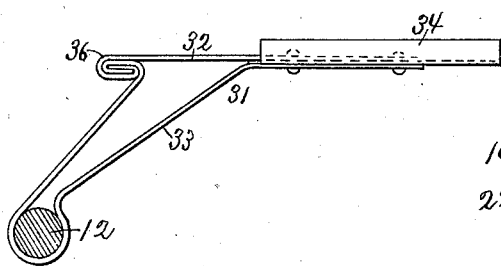
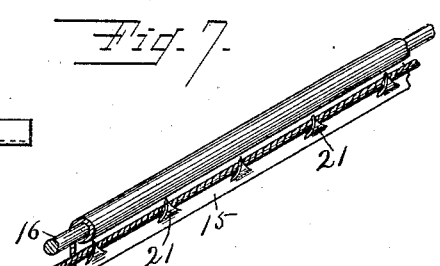
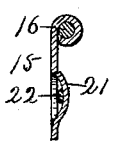
Witnesses:
S. R. Richards
H. M. Richards
Inventor:
C. F. Nelson,
By W. B. Richards,
Atty.
THE NORRIS PETERS CO., PHOTO-LITHO., WASHINGTON, D. C.

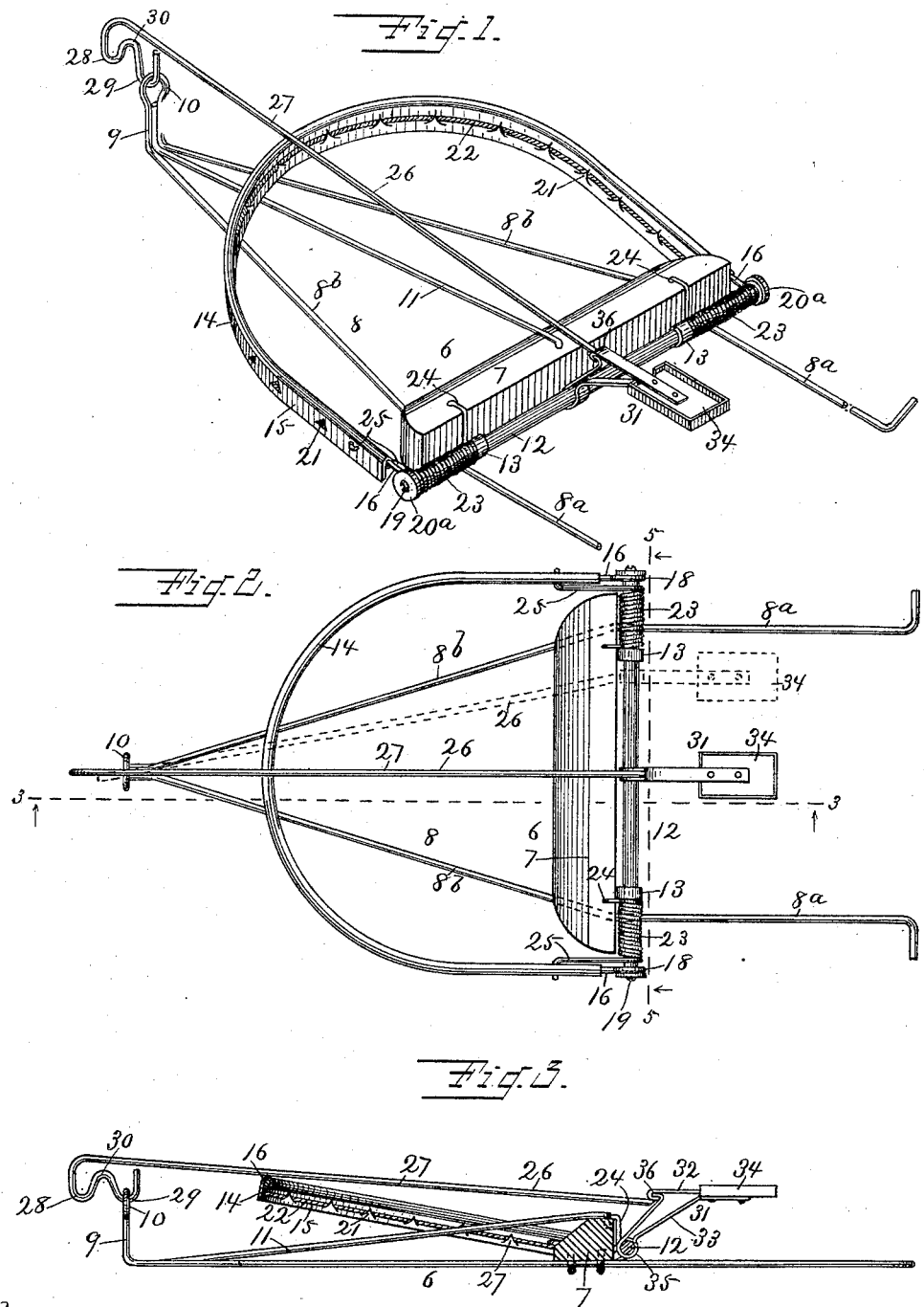

UNITED STATES PATENT OFFICE.

CHARLES F. NELSON, OF GALESBURG, ILLINOIS, ASSIGNOR OF ONE-HALF TO JOSEPH H. BLOOMFIELD, OF SAME PLACE.

ANIMAL-TRAP.

SPECIFICATION forming part of Letters Patent No. 612,866, dated October 25, 1898.

Application filed October 25, 1897. Serial No. 656,280. (No model.)

*To all whom it may concern:*

Be it known that I, CHARLES F. NELSON, a citizen of the United States, residing at Galesburg, in the county of Knox and State of Illinois, have invented certain new and useful Improvements in Animal-Traps, of which the following is a specification.

This invention relates generally to animal-traps, and more particularly to such traps when designed for entrapping English sparrows and other birds.

The objects of the invention are to provide traps which are simple in construction, sensitive in operation, have an adjustable trigger, a net carried by the swinging jaw, improved construction of jaw and means for connecting the net therewith, and which embody a novel combination of parts in their frames; and the invention consists in constructions and combinations utilized in carrying out these objects of the invention and which are hereinafter described and made the subject-matter of claims hereto appended.

In the accompanying drawings, Figure 1 is a perspective showing my improved trap in its set position with the net removed to more distinctly show parts covered thereby; Fig. 2, a top plan of the trap as shown at Fig. 1; Fig. 3, a sectional elevation in the line 3 3 in Fig. 2; Fig. 4, a top plan with the net in place and showing the trap as sprung; Fig. 5, an enlarged sectional elevation in the line 5 5 in Fig. 2; Fig. 6, an enlarged detail, a side elevation of the tilting platform, and sectional elevation of the shaft on which it is journaled; Fig. 7, an enlarged detail, showing in perspective the manner of securing the netting to the bow or jaw; and Fig. 8, an enlarged detail, a transverse sectional elevation in Fig. 7.

The reference characters herein used indicate, respectively, the same part in the different figures of the drawings.

The frame 6, which carries the operating parts, is formed of a transversely-arranged bar 7, to each end of which bar and at its under side is secured at its mid-length portion a rod or wire 8. One end $8^a$ of each rod 8 extends at substantially a right angle to the bar 7 and is bent outwardly at its outer end for a purpose hereinafter described. The ends $8^b$ of the rods 8 extend from the other side of the bar 7 and, converging, are bent upwardly to form a standard 9. The two rods $8^b$ are formed of a single wire or rod bent at its mid-length portion to form an eye 10. A wire or rod 11, fixed at one of its ends to the upper side and mid-length part of the bar 7, extends therefrom and is turned upwardly at its outer end between the rods which form the standard 9, to which it is fixed by soldering or otherwise. The bar 12, also a part of the frame 6, is fixed to one side of the bar 7 by clips 13. As shown, the bar 7 is rounded off at its ends on one side and beveled off on its upper side opposite the bar 12, for purposes hereinafter described.

The bow or jaw 14 is formed of a strip of sheet metal 15, one edge of which is curved or bent to receive a wire or rod 16, the ends of which rod project beyond the ends of the strip 15 and are bent to form eyes 18, (see Fig. 2,) which are journaled on pintles 19, which project from the ends of the bar 12. Washers $20^a$ on the outer ends of the pintles 19 retain the eyes 18 in place, while permitting them to rotate on said pintles. The curved side of the netting 20 is secured to the bow or jaw 14 as follows: Spurs 21 are formed in the strip 15 by cuts therethrough, as shown best at Figs. 7 and 8. The spurs 21 being first turned slightly outward, a cord 22 is threaded through beneath the series of spurs, which are then turned down upon the cord, as shown best at same figures, to securely hold the cord in place. The adjacent edge of the netting is then secured to said cord by sewing or otherwise. The straight side of the netting extends over the bar 7 and is fixed to its beveled upper side and rounded ends by tacking or otherwise to extend to the ground-surface when the trap is set, and thus form a sparrow-tight inclosure. The rounded ends of the bar 7 will prevent the netting interfering with the operation of the bow or jaw 14. Tension-springs 23 are helically and loosely coiled one on each end part of the bar 12, and one end, 24, of each of said springs is extended upwardly and fixed to the bar 7, while the other end, 25, of each spring is extended and fixed to the adjacent end part of the bow or jaw 14 at a short distance from its end. (See Fig. 2.)

The trigger 26 has a straight end part 27, and its other or proximal end part is bent to form two loops 28 and 29, with a part 30 between said loops, and which part 30 is a sufficient distance from the straight part of the trigger to permit of adjusting the trigger with either loop 28 or 29 in engagement with the eye 10, whereby the trigger may be shortened or lengthened for purposes hereinafter named.

A tilting platform 31 is pivotally and slidably mounted on the bar 12 by means of sheet-metal strips 32 and 33, one end of each of which strips is fixed to the table 34 of the platform. The strip 33 extends downwardly, is bent to form an eye 35, whereby the tilting platform is journaled on the bar 12, and thence extends upwardly to where its end is curved and interlocked with the curved end of the strip 32 to form a detent 36, with the under side of which the distal end of the trigger 26 engages when the trap is set, as shown at Figs. 1, 2, and 3. When the trap is set as described, the helical springs 23 are brought under tension, whereby they will forcibly and rapidly throw the bow or jaw 14 and netting into the positions shown at Fig. 4 to catch the game when the trap is sprung by birds or other animals pressing in any manner on the table 34 and tilting the platform 31, and thereby removing the detent 36 from the trigger 26. The outwardly-bent ends of the rods 8ª will be struck by the bow 14 when it descends, and thereby held to prevent the bar 7 from rising from reactionary force and permitting the escape of birds.

It is often desirable to locate or set traps near walls or other objects, and in such cases and for other reasons it is preferable to have the bait-table 34 as far as possible from such obstacle or at one side or the other of the trap. For this purpose the tilting platform 31 is made adjustable on and lengthwise of the bar 12, so that it may be adjusted to either side of the trap, as indicated by dotted lines at Fig. 2, or adjusted centrally thereof, as shown by full lines. When the platform 31, with its bait-table and detent, are adjusted centrally of the trap, the trigger 26 is then adjusted with its loop 29 engaged with the eye 10, and when said tilting table is adjusted to one side of the trap the trigger 26 is adjusted with its loop 28 engaged with the eye 10, whereby the trigger is properly lengthened for coaction with the detent.

Having thus described my invention, what I claim as new, and desire to secure by Letters Patent, is—

1. In animal-traps, and in combination, a transverse frame-bar, a bar fixed thereto, a jaw or bow pivotally mounted on said fixed bar, helical springs mounted on said fixed bar having one of their ends connected with said fixed bar and their other ends connected with the jaw or bow, frame-rods fixed to said transverse bar and extending on each side thereof, and provided on one side of the transverse bar with a standard and eye at the outer end thereof, substantially as described.

2. In a trap of the class described and in combination, a transverse frame-bar, and a frame-bar secured to said transverse bar and bent to form a standard having an eye, and end parts 8ᵇ on one side of the transverse bar, and parts 8ª on the other side of the transverse bar, substantially as described.

3. In a trap of the class described, and in combination, a transverse frame-bar, a rod bent to form a standard having an eye and secured to said transverse bar so as to have parts 8ª extending on one side thereof and parts 8ᵇ extending on the other side thereof, a bow or jaw pivotally connected to said transverse bar, a trigger pivotally connected to said eye, and a tilting detent for said trigger, substantially as described.

4. In a trap of the class described, and in combination, a transverse frame-bar, a frame secured thereto, a standard on said frame, a pivoted jaw or bow, a trigger having an adjustable pivotal connection with said standard, and a detent laterally adjustably mounted on said transverse bar, substantially as described.

5. In a trap of the class described and in combination, a transverse frame-bar, a rod bent to form a standard having an eye, and secured to said transverse bar, a pivoted jaw or bow, a trigger having a plurality of loops each adapted for engagement with said eye, and a detent pivotally and laterally adjustably mounted on said transverse bar, substantially as described.

6. In traps of the class described, and in combination, a transverse frame-bar, a rod secured to said transverse frame-bar, said rod bent to form an eye, a standard and arms 8ª and 8ᵇ, a bar fixed to said frame-bar, a jaw or bow pivotally connected to said fixed bar, a detent pivotally and adjustably mounted on said fixed bar, springs mounted on said fixed bar with one of their ends connected with said frame-bar and their other ends connected with the bow or jaw, substantially as described.

7. In traps of the class described, and in combination, a transverse frame-bar, a rod secured to said transverse frame-bar, said rod bent to form an eye, a standard, and arms 8ª and 8ᵇ, a bar fixed to said frame-bar, a jaw or bow pivotally connected with said fixed bar, a tilting platform with a bait-table fixed thereto, strips, one end of each of which is fixed to said bait-table, one of which strips is bent to form a slidable and tilting connection with said fixed bar, and the ends of which strips are folded together to connect them and form a detent, and a netting fixed to said transverse frame-bar and to the bow or jaw, substantially as described.

8. In traps of the class described, and in combination with the jaw or bow, a netting, a wire or rod bent to form the bow and its ends bent to form eyes by which the bow is hinged to the trap-frame, a strip of sheet metal fixed to said bow and forming part thereof, spurs formed by angular cuts through said strip, and a cord to which the netting is secured, which cord is secured to said strip by threading it beneath the series of spurs and by the spurs bent to secure it in place, substantially as described.

9. In traps of the class described, and in combination, a frame, a bow or jaw hinged thereto, and comprising a rod or wire bent in the form of the jaw or bow and to form hinges or eyes on its ends, and a strip of sheet metal bent or curved along one of its edges to receive said wire or rod, and its other edge projecting downward to form the lower part of the bow or jaw, substantially as described.

In testimony whereof I affix my signature in presence of two witnesses.

CHARLES F. NELSON.

Witnesses:
J. D. WELSH,
H. M. RICHARDS.